United States Patent [19]

Murray

[11] 4,389,990

[45] Jun. 28, 1983

[54] SERVO APPARATUS FOR AN AUTOMATIC SPEED CONTROL OF VEHICLES

[75] Inventor: Alan B. Murray, Forest Hills, South Africa

[73] Assignee: Control Logic (Proprietary) Limited, Durban, South Africa

[21] Appl. No.: 305,353

[22] Filed: Sep. 24, 1981

[51] Int. Cl.³ .............................................. F02D 11/10
[52] U.S. Cl. ................................. 123/353; 123/361; 180/178; 318/599
[58] Field of Search ............... 123/353, 361, 399, 354; 180/178, 179; 318/599, 606

[56] References Cited

U.S. PATENT DOCUMENTS

| | | | |
|---|---|---|---|
| 3,436,635 | 4/1969 | James et al. | 318/599 |
| 3,525,017 | 8/1970 | Rosenberg et al. | 123/361 |
| 3,809,034 | 5/1974 | Durichen | 123/361 |
| 4,098,242 | 7/1978 | Anderson | 123/353 |
| 4,270,502 | 6/1981 | Seilly | 123/361 |
| 4,300,081 | 11/1981 | Van Landingham | 318/599 |
| 4,352,404 | 10/1982 | Stier | 123/361 |

Primary Examiner—Charles J. Myhre
Assistant Examiner—Andrew M. Dolinar
Attorney, Agent, or Firm—Cushman, Darby & Cushman

[57] ABSTRACT

A servo apparatus for automatic control of vehicle engine speed, in accordance with a speed error signal, has an electric motor connectable to open the engine throttle against a restoring force, and the motor torque is controlled by varying the pulse width of the motor drive current. The pulse width is controlled by the error signal through a feedback stabilized amplifier and in addition, motor back emf is sampled and used to control the pulse width during motor braking phases.

14 Claims, 4 Drawing Figures

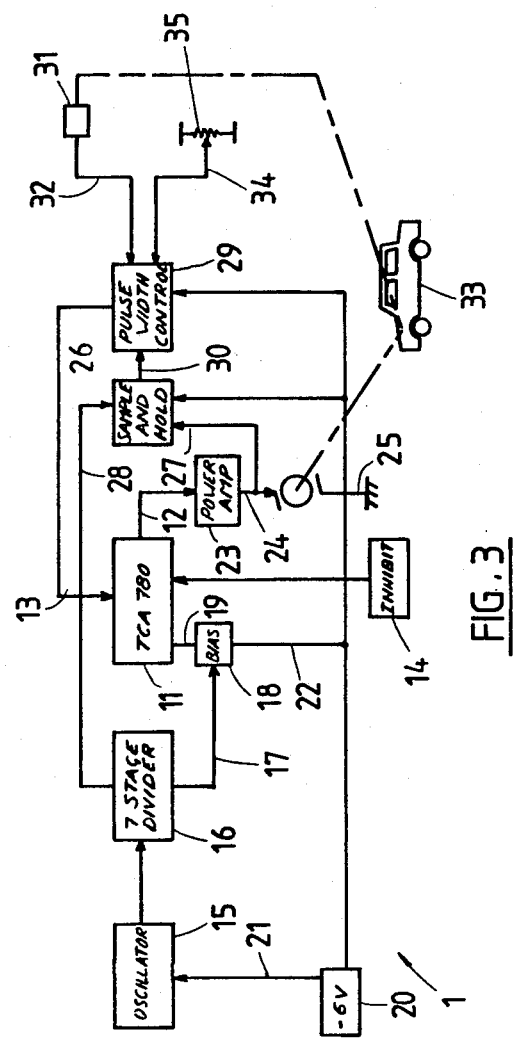
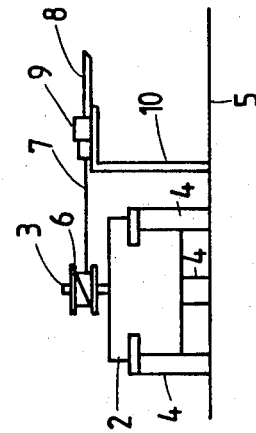
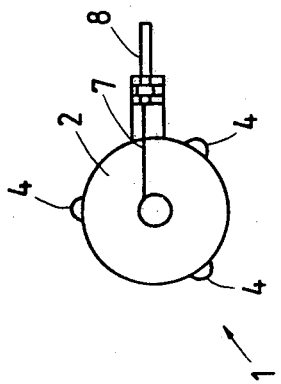
FIG. 3
FIG. 1
FIG. 2

SERVO APPARATUS FOR AN AUTOMATIC SPEED CONTROL OF VEHICLES

BACKGROUND TO THE INVENTION

This invention relates to a servo apparatus for automatic speed control of engines, and in particular servo apparatus which is used to operate a vehicle engine speed throttle.

Most automatic speed control systems for vehicles, whether they use a vacuum or electric motor operated throttles servo, have a positive movement of the servo mechanism to open and to close the throttle.

For example, in the case of a vacuum operated servo the servo is operated by two valves which alternatively admit air or evacuate the zero chamber according to the speed and load variations which are being registered by the vehicle speed transducer. Another system which is used with vacuum servos is an oscillating valve which admits air to, or exhausts air from the servo chamber in accordance with valve control impulses having a variable mark space ratio. Similarly, if an electric motor is used, forward or reverse signals may be applied to the motor which cause the motor to run in the required controlled direction.

One of the difficulties in automatic speed control is that the apparatus is required to fail safe. In this regard the vacuum systems are simple since they can easily be arranged by known methods to fail safe.

On the other hand, while motor driven servos have advantages in that they require no vacuum connection to the vehicle engine, they are more difficult to arrange to fail safe. This is as a result of the motor drive system which drives the throttle actuator arm through a system of reduction gears and a clutch. Should failure occur it is necessary that the clutch be speedily disengaged and because of the mechanical complexity of the gear and clutch system, the changes of a failure of the clutch to release properly or disengage speedily enough, are increased. The use of an electric motor driven in one direction only against a restoring or biasing force, avoids this difficulty, but requires a specialised control system to prevent motor hunting. Feedback of motor position is usually provided by a mechanical connection to a sensor such as a potentiometer.

OBJECT OF THE INVENTION

It is an object of this invention to provide a servo apparatus for automatic speed control of engines which will fail safe efficiently and operate an engine speed throttle in a controlled manner.

SUMMARY OF THE INVENTION

In accordance with this invention there is provided servo apparatus for automatic control of an engine throttle in accordance with an error signal, comprising:

an electric motor, adapted to have a direct linkage on its shaft which is connectable to a vehicle engine throttle to open the throttle against a biasing force by shaft rotation in one direction, and to release the throttle by rotation in the other direction;

a sampling circuit for sampling stable motor back emf values;

a pulsed waveform signal generator having its output connected to drive the motor, and an input for a control signal in accordance with which the pulsed waveform signal is variable to vary the motor torque in the direction of rotation of throttle opening; and, a control unit having its output connected to the generator control signal input, and having an error signal input and a further input connected to receive values from the sampling circuit, the unit being adapted to vary the pulsed waveform signal in accordance with the error signal to rotate the shaft and open the throttle in a controlled manner, to use the sampling circuit input in addition to the error signal to vary the pulsed wave form signal to allow the shaft to rotate and release the throttle under the biasing force, and, to maintain the motor in a stalled condition, in order to control the engine speed.

Preferably the error signal will be proportional to the difference between voltage signals which represent the actual and desired speeds of a vehicle which is being driven by the engine. The error signal may of course be proportional to voltages which represent actual and desired values of engine speed itself.

A feature of this invention provides the pulse width of the pulse waveform signal to be varied, but optionally the frequency of constant pulses may be varied instead or additionally.

There is also provided for the sampled values to be aggregated by a sample and hold circuit and for sampling to be activated by a pulse a predetermined time after the commencement of a pulse of the waveform signal generator.

There is further provided for the error signal to be taken to an amplifier having a stabilized feedback circuit for controlled response to the error signal. Preferably the sampled values will be used only when they are negative relative to the pulsed waveform signal, and for this effect to be achieved by a diode at the output of an inverting amplifier, to which the aggregate of sampled back emf values are input.

Preferably the aggregate sampled values and the error signal are summed at the input to the error signal amplifier.

Still further, there is provided for a selectively activatable inhibit function to be connected to the generator to selectively cut-off the pulsed waveform output to cause the motor to release the throttle under the biasing force without any motor braking force applied by the pulsed waveform signal.

Further in accordance with this invention there is provided a method of automatically controlling an engine throttle in accordance with an error signal comprising;

connecting an electric motor directly to the throttle to open the throttle against a biasing force by motor shaft rotation in a first direction, and to release the throttle under the biasing force by shaft rotation in the second direction;

producing a pulsed waveform signal to drive the electric motor to open the throttle;

varying the pulsed waveform signal to vary the torque of the motor in the first rotational direction;

sampling the motor back emf when it is stable; and, controlling the variation of the pulsed waveform accordance with the error signal to cause controlled opening of the throttle, and additionally in accordance with the sampled emf, to cause controlled release of the throttle, and to cause the throttle to be held in a set position with the motor stalled, in order to control the engine speed.

Features of this method provide for the error signal to represent the difference between the desired and actual speed of a vehicle which is being driven by the engine.

Preferably the variation of the pulsed wave form signal will be by variation of the pulse width thereof, and the sampling will take place at a predetermined time after commencement of each pulse of the pulse wave form signal.

There is also provided for the sampled values to be accumulated and to be used only when they are negative relative to the pulsed waveform signal.

There is further provided for the engine throttle to be returnable to its normally closed or idle position by inhibiting the waveform generator from sending out its signal to the motor, and allowing the biasing force to release the throttle with the motor shaft rotating freely in the releasing direction.

BRIEF DESCRIPTION OF DRAWINGS

A preferred embodiment of the invention is described below by way of example only, and with reference to the accompanying drawing, in which:

FIG. 1 is a plan view of a motor and linkage according to the invention;

FIG. 2 is a side view of the motor a linkage in FIG. 1;

FIG. 3 shows a block circuit diagram of a servo control circuit in use with an electric motor to automatically control the speed of a vehicle; and, FIG. 4 is a detailed circuit diagram of aspects of the block circuit of FIG. 3.

DETAILED DESCRIPTION OF DRAWINGS

Figure 4:
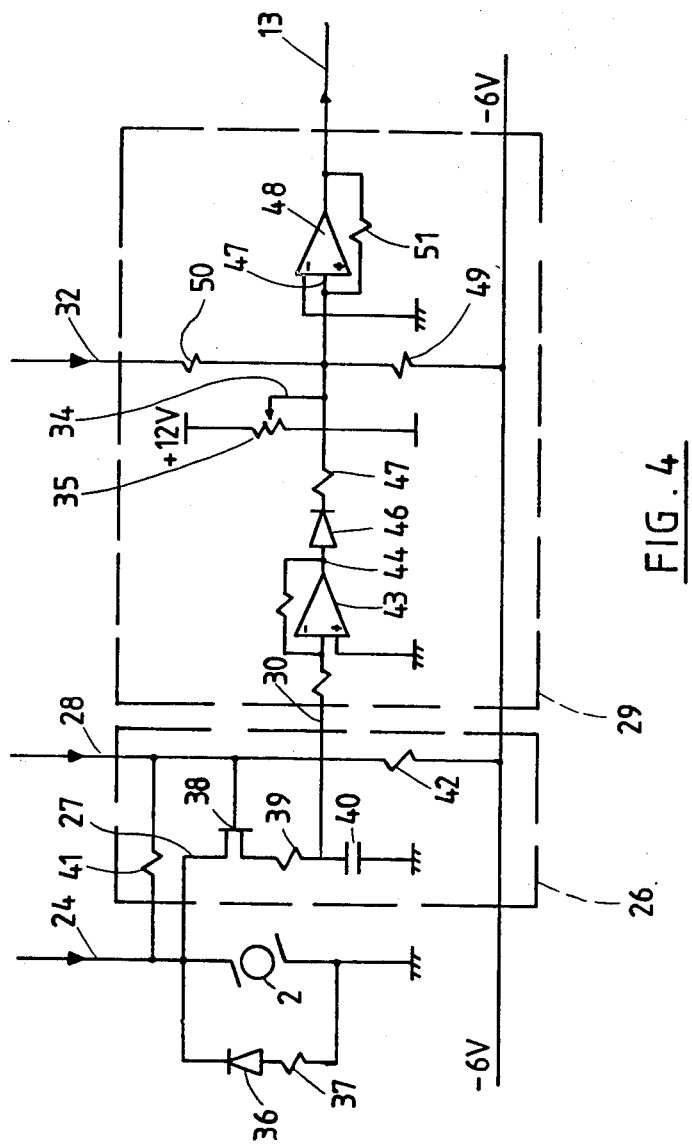

As illustrated, servo apparatus 1 includes a d.c. motor 2 having a shaft 3 protruding from one end thereof, the motor being mounted by supports 4 to a base 5.

The shaft 3 has a pulley 6 on the end thereof which is connected to wind therearound in use a cable 7 to a vehicle throttle (not shown).

The throttle cable 7 has an outer cover 8 which is mounted by a bracket 9 to a support 10 which is secured to the base 5.

The vehicle throttle is biased in the close position as is usually done on motor vehicles. If such a biasing is not present on the vehicle, biasing means may be provided on the vehicle at the throttle end or may be provided on the motor itself.

In use, current from the servo control circuit apparatus is supplied to drive the motor. It will be appreciated that this current is directly proportional to the required movement of the vehicle throttle. Clearly, an increase in motor drive current will cause the motor to rotate to turn the pulley to wind in the cable against the throttle spring biasing and thus open the throttle.

If no change of speed is required, a constant current will be supplied to the motor and the force of the motor on the pulley will equal that of the spring biasing, and thus the throttle opening will remain constant.

Should however the current decrease, thereby indicating a required decrease in vehicle speed, the spring biasing force will overcome that of the motor and the cable will be unwound from the pulley, against the braking force of the motor, thus closing the throttle to the desired extent.

If no current is supplied to the motor, the spring biasing will be free to close the throttle in substantially as short a space of time as would occur if the throttle cable was connected to a spring biased accelerator pedal, and operated by the foot of a driver of a vehicle.

Referring now to FIG. 3, the centre of the servo circuit comprises a TCA 780 chip 11, which can produce a square wave output along its output line 12, and the pulse width of the output wave form can be varied by a control signal fed into its relevant input from line 13. The square wave output at line 12 may be inhibited completely by a signal from an inhibit means 14.

The basic timing required by the chip 11 is provided by an oscillator 15 feeding into a seven stage divider 16 to obtain the correct frequency. The divider 16 feeds the required frequency through a line 17 into a bias means 18 and from thence into the chip 11 through line 19. The bias means is provided for the internal working of the chip 11, which requires that the timing signal must pass through zero.

A voltage of minus 6 volts is provided by a voltage source 20, and this voltage is taken via line 21 to the oscillator, and via line 22 to the bias means. This voltage is necessitated by the particular requirement of the chip 11.

The square wave output on line 12 from the chip 11 is taken to a power amplifier 23 which feeds the drive circuit of motor 2 via line 24. The motor drive circuit is taken to earth at 25. A sample and hold circuit 26 is provided, and is connected to sample voltage from line 27 between the power amplifier and the motor from line 24. The circuit will only sample when it receives a signal along line 28 from the seven stage divider. It is otherwise switched off by biasing provided from the minus 6 volt line.

A pulse width controller 29 receives a minus 6 volt supply, and has its output connected to line 13, which is the pulse width control line for the chip 11. Three inputs are provided for the pulse width controller to operate on in order to produce the pulse width control output signal on the line 13.

The first input, along line 30, is from the sample and hold and represents sampled back emf voltage. The second of these inputs is provided from vehicle speed control electronics 31 connected via line 32 to the pulse width controller. The vehicle speed control electronics are located within the vehicle 33, and provide the voltage signal which is proportional to the difference between desired and actual vehicle speeds. Any suitable circuitry may be used to obtain this error signal and a wide variety of sensor devices and circuit methods are known for this purpose. The third input, along line 34, is taken from a potentiometer 35 and is merely a reference signal for final calibration of the apparatus.

The inhibit function 14 may be selected by a driver of the vehicle 33, and is also connected to the brake foot pedal in the vehicle to immediately be activated should the brake pedal be operated.

FIG. 4 shows a detailed circuit diagram of the sample and hold circuit 26 and pulse width controller 29. The electric motor 2 has a diode 36 and resistor 37 in series across it, for rapid quenching of inductive surge resulting from the back emf effect after a drop in drive current.

The sampling take-off line 27 passes through a field effect transistor 38 (FET) and through a resistor 39 and capacitor 40 to earth. The gate of the FET is biased from the motor drive line 24 through a resistor 41 and is taken through a high resistance 42 to minus 6 volts. The resistance 42 is preferably of the order of 6 M ohm, and the minus 6 volts ensures that the FET is off until turned on by pulses from the divider line 28 which is connected to the FET gate.

The pulse width controller 29 is based on a dual operational amplifier (op amp) chip, and the sample signal on line 30 is taken to the inverting input of the first op amp 43 of the pair, which is in an inverting configuration. The output 44 of this op amp passes through a diode 45 and resistor 46 to the non-inverting input 47 of the second op amp 48 of the pair.

The inverting input of the op amp 48 is earthed, while the input 47 thereof is taken through resistor 49 to minus 6 volts.

The potentiometer 35 has its tap line 34 connected to input 47, and the error signal on line 32 is also connected, via resistor 50, to this input.

The calibration facility on line 34, the error signal on line 32, and the sample signal on line 30 after passing through op amp 43, thus form a summing junction at the input 47 of the second op amp. The usual feedback is provided from this op amp output to the input 47 by resistor 51 connected therebetween.

In use, the vehicle speed control electronics provides an error signal to the summing junction at input 47 of op amp 48, and the op amp output controls the pulse width of the motor drive signal via line 13 to the TCA 780. This output will vary between 0 and 6 volts, the resulting pulse width being a maximum at 0 volts control voltage and a minimum at 6 volts control voltage. The feedback resistance 51 ensures stability and a controlled motor response with minimal motor hunting when the motor is driven.

During this time the sampling circuit will be sampling the back emf of the motor. The sampling only occurs during FET 38 switch on periods, which are controlled by the divider 16 along line 28. The divider is arranged to cause sampling a predetermined time after the commencement of a motor drive pulse, to avoid sampling negative spikes from inductive discharge in the motor coil after the end of a motor drive pulse. This inductive discharge is quenched relatively quickly by the diode 36 and resistor 37, but is usually high as a result of the rotor core iron. The predetermined time is arrived at empirically.

The sampled values are stored in capacitor 40 and read at the input to the first op amp 43. The back emf sampling, however, is only used to influence the motor drive signal during release of the throttle under the throttle biasing force.

When the sampled back emf voltage is positive, the output of op amp 43 will be negative, and would tend to incorrectly reduce an error signal coming in on line 32 to the summing junction at input 47 of the second op amp 48. The diode 45 prevents this occuring.

With a small pulse width, the sampled back emf voltage will be negative and thus tend to increase the summing junction voltage to cause an increase in motor drive current to brake the motor against the throttle biasing force. In this way a controlled release of the throttle is obtained.

A secondary feedback effect also occurs which aids in braking the motor under throttle release conditions. This secondary effect is caused by the back emf voltage on line 24 being sensed at the output of op amp 48 through the power amp 23 and chip 11. The feedback resistor 51 will operate to move the op amp 48 output in accordance with this back emf voltage.

When the error signal is zero or minimal, the motor will be controlled to balance the throttle biasing force and will be in a stalled condition.

If a driver requires the vehicle to return to manual speed control, be can activate the inhibit function to cut off the motor drive current.

The vehicle throttle will return to its closed position under the throttle biasing force. This action will of course be braked by the motor inertia against rotation, as well as the force resulting from the motor running as a generator. Since the diode 36 and resistor 37 dissipate this generated current, this braking force is minimal and the throttle returns to its closed position in substantially the same time as it would under manual control from a foot pedal.

The same result is obtained when the vehicle's brakes are applied, and the inhibit function is automatically activated.

It will be appreciated that the selection of a desired vehicle speed is made through an input to the electronics system which produces the error signal, and is not relevant here.

The embodiment described is particularly suitable for use with a wound core electric motor, but will operate equally well with a printed circuit motor. A printed circuit motor will not have such high inductive surges, since there is much less iron to store energy in. Such motors are, however, generally considerably more expensive than wound core motors.

It has been found in practice that the servo motor and circuit operate to maintain vehicle speed with good accuracy and to fail safe within a short time.

It will be understood that while the invention has been described in use for the control of vehicle speed, which is related to but not necessarily proportional to vehicle engine speed, it may be used to control engine speed as well. Such an application, for example for a motor-generator set, is dependent on the error signal input and is not directly related to the servo control circuit. Instead of a sensor measuring actual vehicle speed, it could measure the engine speed directly.

What I claim as new and desire to secure by Letters Patent is:

1. Servo apparatus for automatic control of an engine throttle in accordance with an error signal, comprising:
   an electric motor, adapted to have a direct linkage on its shaft which is connectable to a vehicle engine throttle to open the throttle against a biasing force by shaft rotation in one direction, and to release the throttle by rotation in the other direction;
   a sampling circuit for sampling stable motor back emf values;
   a pulsed waveform signal generator having its output connected to drive the motor, and an input for a control signal in accordance with which the pulsed waveform signal is variable to vary the motor torque in the direction of rotation of throttle opening;
   a control unit having its output connected to the generator control signal input, and having an error signal input, and a further input connected to receive values from the sampling circuit, the unit being adapted to vary the pulsed waveform signal to rotate the shaft in accordance with the error signal and open the throttle in a controlled manner, to use the sampling circuit input in addition to the error signal to vary the pulsed waveform signal to allow the shaft to rotate and release the throttle under the biasing force, and, to maintain the motor in a stalled condition.

2. Apparatus as claimed in claim 1 in which the pulse width of the pulsed waveform signal is variable.

3. Apparatus as claimed in claim 1 in which the error signal is proportional to the difference between actual and desired speeds of a motor vehicle powered by the engine.

4. Apparatus as claimed in claim 1, 2 or 3 in which the error signal input is to an amplifier in the control unit having a stabilized feedback circuit for controlled output response to the error signal.

5. Apparatus as claimed in claim 4 in which the sampled values are accumulated and fed into an inverting amplifier having a diode in series with its output to prevent the amplifier output from going negative as a result of positive sampled values.

6. Apparatus as claimed in claim 5 in which the inverting amplifier output is connected to be summed with the error signal at the input to the amplifier for the error signal.

7. Apparatus as claimed in claim 2 in which the sampling circuit is activated to sample a predetermined time after commencement of each pulse of the pulsed waveform signal.

8. Apparatus as claimed in claim 1 in which an inhibit unit is provided connected to the waveform generator and being selectively operable to cut off the output of the waveform generator.

9. A method of automatically controlling an engine throttle in accordance with an error signal, comprising:
   connecting an electric motor directly to the throttle to open the throttle against a biasing force by motor shaft rotation in a first direction, and to release the throttle under the biasing force by shaft rotation in the second direction;
   producing a pulsed waveform signal to drive the electric motor to open the throttle;
   varying the pulsed waveform signal to vary the torque of the motor in the first rotational direction;
   sampling the motor back emf when it is stable; and,
   controlling the variation of the pulsed waveform in accordance with the error signal to cause controlled opening of the throttle, and additionally in accordance with the sampled emf, to cause controlled release of the throttle, and to cause the throttle to be held in a set position with the motor stalled, in order to control the engine speed.

10. A method as claimed in claim 9 in which the error signal represents the difference between the desired and actual speed of a vehicle which is powered by the engine.

11. A method as claimed in claim 10 in which the pulsed waveform signal is varied by varying the pulse width of the signal.

12. A method as claimed in claim 10 in which the back emf is sampled a predetermined time after commencement of each pulse of the pulse waveform signal.

13. A method as claimed in any one of claims 10, 11 or 12 in which sampled values are accumulated and used only when they are negative relative to the pulsed waveform signal.

14. A method as claimed in claim 10 in which the pulsed waveform generator is selectively inhibitable to selectively allow the biasing force to release the throttle with the motor shaft rotating freely in the releasing direction.

* * * * *